United States Patent [19]

Sordello et al.

[11] 3,792,361

[45] Feb. 12, 1974

[54] HIGH SPEED DATA SEPARATOR

[75] Inventors: Frank J. Sordello, San Jose; Robert L. Cloke, Santa Clara, both of Calif.

[73] Assignee: Itel Corporation, San Francisco, Calif.

[22] Filed: Aug. 23, 1972

[21] Appl. No.: 283,106

[52] U.S. Cl. .................... 328/63, 307/269, 328/109, 328/139, 328/165

[51] Int. Cl. ......................... H03k 5/153, H03k 5/18

[58] Field of Search ...... 307/269; 328/63, 109, 110, 328/105, 139, 165, 151, 119; 340/171 R

[56] References Cited

UNITED STATES PATENTS

| | | | |
|---|---|---|---|
| 3,518,554 | 6/1970 | Gabor | 328/63 |
| 3,567,960 | 3/1971 | Owen et al. | 328/139 X |
| 3,609,560 | 9/1971 | Greenberg | 328/139 X |
| 3,663,883 | 5/1972 | Olso | 328/63 X |

*Primary Examiner*—John S. Heyman
*Assistant Examiner*—L. N. Anagnos
*Attorney, Agent, or Firm*—Moore, Zimmerman & Dubb

[57] ABSTRACT

This invention involves a circuit capable of phase locking onto a data input signal for the separation of the clocking and data segments of the signal.

6 Claims, 6 Drawing Figures

HIGH SPEED DATA SEPARATOR

REFERENCE TO RELATED APPLICATIONS

This invention utilizes an oscillator of the type disclosed in the U.S. Pat. of Frank J. Sordello, No. 3,694,772, issued Sept. 26, 1972 and entitled A VOLTAGE CONTROL SAW-TOOTH OSCILLATOR WITH FLY BACK TIME INDEPENDENT OF FREQUENCY.

BACKGROUND OF THE INVENTION

1. Field of the Invention

The invention relates to those signal generators incorporating an oscillator capable of locking onto a data signal for gating the data and clocking signals of the data transmission.

2. Description of the Prior Art

Oscillators of the variable frequency type are used in such installations as data processing systems for synchronizing circuits to accommodate the reading and processing of data conveying signals. The oscillators must be of the variable frequency type to permit locking onto the input data signal such that the intermingled data and clocking signals can be separated for processing of the data. Naturally the oscillator must have a frequency capability and range to match that of the data signal and must also be able to change or accommodate frequency changes in the data as the data is transmitted through the system.

In the usual manner, a signal is generated to control gating circuits capable of opening and closing in a manner to permit passage of the data and clocking intelligence through selected output lines. Not only does the frequency of this data signal vary, but additionally some of the clocking or data signals might be omitted due to discrepancies in the system or due to the type of recording code utilized. For instance with use of a code such as modified frequency modulation the clocking signals are omitted in special circumstances. Therefore the separation circuit must exhibit a fly-wheel effect to carry the frequency through those areas where no clocking signal exists on which the oscillator can lock.

With newer generation data recording and handling devices, the frequency of the recorded data has been increased substantially. Naturally with the doubling or quadrupling of the data signal frequency, problems of separation of the data and clocking signals have increased. For instance, in the past, some such data separating circuits have utilized a saw-tooth generator wherein each fly-down time which represented the gating pulse for permitting passage of either a clocking or data signal was followed by a fly-back portion of the oscillator signal. Naturally the fly-back signal was preferably of short generation since it subtracted from the duration of the fly-down time during which time the intelligence of the signal is transmitted. Any subtraction for that time makes the window narrower thereby increasing the possiblity that the pulse being detected will not fall within that window and therefore be lost or missed. However, in reducing the fly-back time certain problems of noise generation are encountered which can interfere with the proper detection and processing of the intelligence carried by the signal.

With the doubling or quadrupling of the frequency of the data signal in the present generation equipment, the time duration during which the oscillator must cycle has been reduced considerably. It therefore follows that the required further reduction in the fly-back time will cause even more noise to be generated which can interfere with the data signal. It is the primary object of the present invention to provide a data separation circuit capable of operation at the frequencies of the data signals used in present generation systems while limiting the usual draw-backs of high noise generation.

SUMMARY OF THE INVENTION

A data detection circuit for separating data and clocking components of a data signal and including a variable frequency oscillator capable of generating signals having differing identifiable slope segments, with gates connected to receive and act alternately in response to the different slope segments, and means for correlating the frequency of the oscillator signal with that of the data signal frequency whereby the gates acting in response to the oscillator will open alternately to permit passage of the data and clocking signals respectively.

DESCRIPTION OF THE INVENTION

For the reading and processing of data signals in computer installations, it is frequently necessary to separate data signal pulses from clock signal pulses in an apparatus called a data separator. For this purpose, the data separator must be able to maintain a frequency synchronization with the data being processed and, in the usual instance, generate windows by opening gates to permit alternately the transmission of the data and the clock pulses to the separate circuits in which they will be utilized. In systems utilizing some recording codes such as modified frequency modulation (MFM), the clocking pulses may be intentionally omitted at various times thereby requiring that the data separator be able to maintain synchronization in the absence of such pulses. Naturally, the data separator must have all the capabilities of matching both the frequency and the frequency variances of the data being processed.

Figure 1:
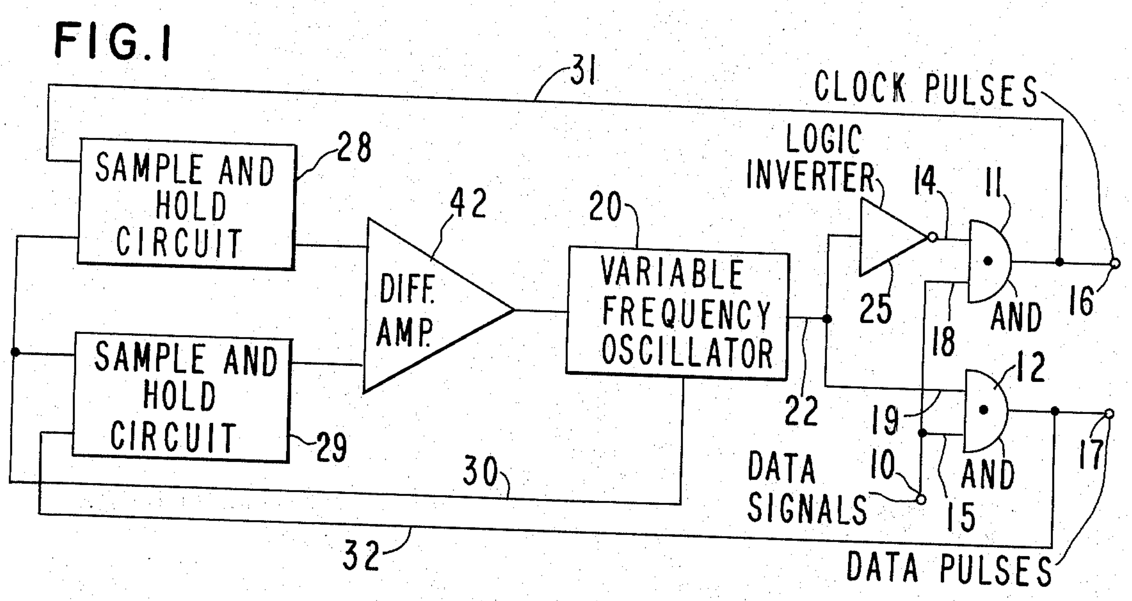
FIG. 1 is a block diagram showing a first embodiment circuit of the subject invention.

Accordingly, there is provided in FIG. 1 a data separator wherein the data input signals are received at terminal 10 and fed to the And gates 11 and 12 which receive through conductors 14 and 19 respectively, additional signals which open the gates at alternate times in a manner to create windows such that a first component of the data signal (the clocking pulse) is conducted only to the terminal 16 and a second component (data pulse) is conducted only to terminal 17. Thus it can be seen that by the proper timing of the windows, the data and clock pulse components of the data signal are separated for reading and processing in a computer system (not shown). Thus, the data signals are received at one terminal of the And gates 11 and 12 and receipt of a signal at the other terminals 14 and 19, respectively, alternately triggers the And gates so as to permit transmission of the clocking and data pulses to the selected terminals.

Figures 2A, 2B, 2C, 2D:
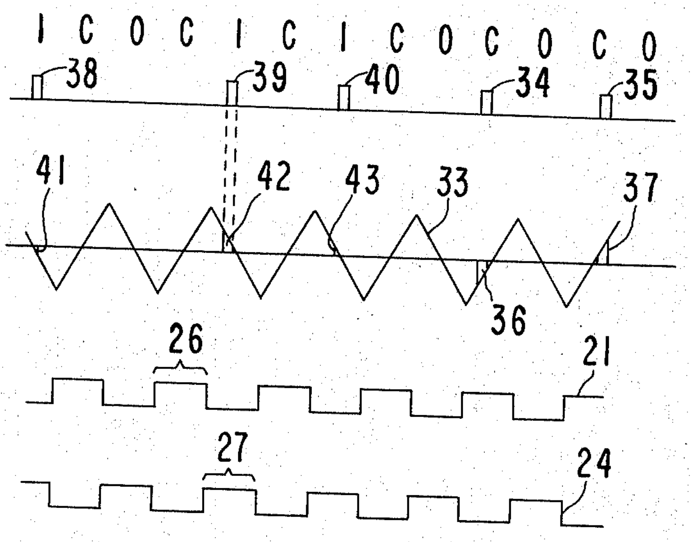
FIGS. 2A–2D is a diagram of various signals encountered in the circuit of FIG. 1.

Accordingly, there is provided a variable frequency oscillator 20 which generates a cyclic square wave signal similar to signal 21 shown in FIG. 2*c*. This square wave signal is fed to the And gate 12 through the conductor 22. Additionally, the signal 24 shown in FIG. 2*d* is fed to the And gate 11 by passage of the signal 21 through the logic invertor 25. Since the And gates open in response to the higher potential peak portions of the signal, the And gate 12 will open in response to the portion 26 of the signal 21 while the And gate 11 will open in response to the portion 27 of the signal 24 which represents and can be identified as the lower potential portion of the signal 21. Thus it can be seen that only one cycling of the square wave is necessary for each data signal comprising a clock and data pulse The data signal appearing in FIG. 2a is one commonly used example of the type of data to be separated in the subject invention. Herein is shown a modified frequency modulation type of encoded data with intermingled pulses wherein a data pulse denotes "one and a no-pulse condition between clocking pulses denotes "zero." No clocking pulse is included unless the clocking pulse falls between two or more "zeros" at which time there will be a pulse representing the clocking signal. Thus it can be seen that the data separator must have a free-wheeling effect so as to continue operation even though clocking pulses may be omitted in the code. The complete details of one type of suitable variable frequency oscillator for use in the subject invention are disclosed in the previously identified U.S. Pat. No. 3,694,772.

As stated before, the variable frequency oscillator must maintain synchronization with the data being separated into the clocking and data components. Accordingly, there is provided a pair of sample and hold circuits 28 and 29 which receive through the conductor 30 a saw-tooth wave form representative of and commonly used to generate the square wave utilized for excitation of the And gates. However, the square wave output signal from the oscillator 20 can also be used to generate such a saw-tooth signal but in most instances, such a signal is already available within the oscillator. Also supplied to the sample and hold circuit 28 through the conductor 31 is the clocking pulse, while the data pulse is provided to the sample and hold circuit 29 through the conductor 32. Thus, each sample and hold circuit is turned on to transmit a portion of the saw-tooth signal as each data or clock pulse is simultaneously received. For instance, as shown in FIG. 2, when the clock pulses 34 and 35 occur in the data signal, the sample and hold circuit 28 is turned on to receive portions 36 and 37 of the saw-tooth wave form. Likewise, when data signals 38, 39 and 40 are received, portions 41, 42 and 43 of the saw-tooth signal are transmitted through the sample and hold circuit 29. The differential amplifier 42 utilizes the pulses transmitted by the sample and hold circuits 28 and 29 to generate a differential signal denoting difference and polarity of the magnitude of the offset between the null point of the saw-tooth form and the data and clocking pulses. This differential signal is thereafter fed to the oscillator 20 to readjust the frequency of the variable frequency oscillator so as to cause concurrence of the zero point of the saw-tooth wave and clock or data pulse of the data signal.

To amplify the description of the sample and hold circuit, the circuit 28 comprises a switch which opens at the leading edge of the clock pulse and stays open for the duration of the pulse to transmit thereafter that part of the saw tooth signal existing during that period. This signal is fed to a capacitor which is charged corresponding to a duration of the transmission of the saw tooth waveform which charge represents the amount to which the center point of the window varies from the clocking signal with the signal polarity indicating the direction which the pulse varies from the midpoint. This charge is then utilized to reset the variable frequency oscillator to adjust the timing of the saw tooth waveform for centering about the clocking pulse thereby adjusting the timing of the window for receiving the clocking pulse. The sample and hold circuit 29 works in the same manner with respect to the data pulse as the circuit 28 does with respect to the clocking pulse. However, because the slope of the waveform is negative with respect to that of the clocking pulse, the signal is fed to a differential amplifier for inversion of the signal prior to transmission to the variable frequency oscillator for resetting the oscillator. Such sample and hold circuits are well-known in the art. For instance, one suitable for the purposes of this invention is disclosed in "Electronic Analog and Hybrid Computers," Korn and Korn, published by McGraw-Hill Book Company, Copyright 1964, Library of Congress No. 63-23389 35360 on pages 226 through 233.

In the manner heretofore described, the variable frequency oscillator is readjusted at all times to seek correlation between the frequency of the data signal and the frequency of the saw-tooth wave form generated by the oscillator. More importantly, the oscillator in gating both data and clocking pulses each cycle with no flyback time can operate at only one-half the frequency of prior art devices while generating little or no noise which might otherwise interfere with the reading of the data.

Figure 3:
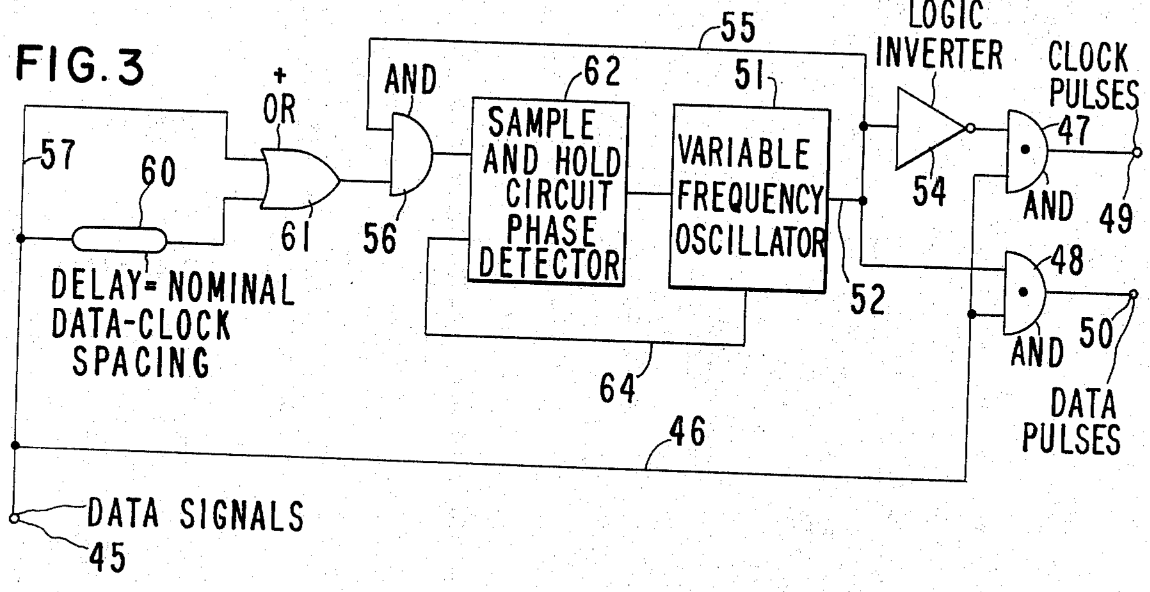
FIG. 3 is a block diagram of a second embodiment of the subject invention.

In FIG. 3 is shown a second embodiment of the invention wherein the data input signal is supplied at the terminal 45 for transmission through the conductor 46 to the And gates 47 and 48 which are energized to permit transmission respectively of the clocking pulses to the terminal 49 and the data pulses to the terminal 50. As in the previous embodiment a variable frequency oscillator 51 supplies a gating signal through conductor 52 directly to the And gate 47. Thus, the And gates are alternately opened to create windows suitable for the passage of the clocking and data pulses.

The principle of operation of this embodiment of the invention is based on the fact that with modified frequency modulation a clock pulse and a data pulse will never be adjacent in the data signal. Therefore, instead of utilizing two sample and hold circuits as in the previous embodiment, only one sample and hold circuit is necessary and the clock pulses received at the sample and hold circuit are delayed exactly one-half the average data pulse frequency so as to cause the clocking pulses to follow within the next following data window for phase locking the oscillator to the data frequency. For this purpose, a delay line, 60, is used to delay the data signals so that a clock pulse component of said signals will appear at the Or gate, 61, at the same nominal time as the following data component would have appeared were it present. The output of Or gate 61 is gated through And gate 56 by a signal which is active during the slope of the ramp appropriate for sampling. Therefore, at the output of And gate 56, there will be a pulse composed of either the data component or a delayed clock component of the data signal which will meet the proper (such as negative-going) slope of the ramp signal in the sample and hold circuit and produce a signal indicative of time-error. The roles of data and clock in the foregoing discussion may be interchanged without changing the basis for the invention, i.e., the gating may be set up so that the data component of the data signals when delayed is gated into the sample and hold while the clock component is gated without being delayed.

Thus it can be seen that the second embodiment offers the advantages of fewer components and further does away with any erroneous signals which might be derived from sample and hold circuits having different characteristics. For instance, the drift frequently encountered in such circuits might be in the opposite directions such that they would read different corrective signals for the same input. Since the same circuit acts in response to both signals, the effect of any such drift is cancelled out.

We claim

1. A data detection circuit for separating first and second components of a data signal comprising; a variable frequency oscillator for generating a cyclic timing signal having first and second identifiable portions during each frequency cycle, first and second gates connected to receive the data signal and transmit that component of the data signal occuring during the period the respective gate is open, means to open the first and second gates in response to the first and second signal portions of the timing signal respectively, and means for corrolating the frequency of the oscillator timing signal and the data signal whereby the gates will each open alternately to permit separate passage of a different component of the data signal.

2. A data detection circuit as defined in claim 1 wherein the timing signal is a square wave and the first and second portions of the timing signal are the positive and negative peaks thereof respectively.

3. A data detection circuit as defined in claim 1 wherein the oscillator frequency corrolating means includes a sample and hold circuit which samples a signal representative of the timing signal in response to the data signal and adjusts the oscillator to corrolate the timing signal and data signal frequencies.

4. A data detection circuit as defined in claim 3 wherein the oscillator frequency corrolating means includes a pair of sample and hold circuits with one sampling the signal representative of the timing signal responsive to the data signal first component and the second sampling the timing signal responsive to the data signal second component and a differential amplifier for receiving and comparing the output signals from the sample and hold circuits for supplying to the oscillator a signal for corrolating the oscillator timing signal and data signal frequencies.

5. A data detection circuit as defined in claim 4 wherein the signal representative of the timing signal is a saw-tooth wave form.

6. A data detection circuit as defined in claim 1 wherein the oscillator frequency corrolating means includes a sample and hold circuit which samples a signal representative of the timing signal in response to one component of the data signal for generating a signal suitable for adjusting the frequency of the oscillator timing signal.

* * * * *